United States Patent
Wybenga et al.

(10) Patent No.: US 7,660,314 B2
(45) Date of Patent: Feb. 9, 2010

(54) APPARATUS AND METHOD FOR MULTI-PROTOCOL ROUTE REDISTRIBUTION IN A MASSIVELY PARALLEL ROUTER

(75) Inventors: Jack C. Wybenga, Plano, TX (US); Patricia Kay Sturm, McKinney, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 833 days.

(21) Appl. No.: 10/833,912

(22) Filed: Apr. 28, 2004

(65) Prior Publication Data
US 2005/0220123 A1  Oct. 6, 2005

Related U.S. Application Data

(60) Provisional application No. 60/558,835, filed on Apr. 2, 2004.

(51) Int. Cl.
*H04L 12/56* (2006.01)
(52) U.S. Cl. ............. 370/400; 370/395.21; 370/395.52
(58) Field of Classification Search .......... None
See application file for complete search history.

(56) References Cited

U.S. PATENT DOCUMENTS

| 5,854,899 A * | 12/1998 | Callon et al. ............. 709/238 |
| 2003/0118027 A1* | 6/2003 | Lee et al. ............. 370/395.21 |
| 2003/0137974 A1* | 7/2003 | Kwan et al. ............. 370/352 |
| 2004/0006640 A1* | 1/2004 | Inderieden et al. ......... 709/242 |

* cited by examiner

*Primary Examiner*—Jayanti K Patel
*Assistant Examiner*—Anthony Sol

(57) ABSTRACT

A router for interconnecting external devices coupled to the router. The router comprises: i) a switch fabric; ii) a plurality of routing nodes coupled to the switch fabric, wherein each of the plurality of routing nodes is capable of exchanging data packets with the external devices and with other ones of the plurality of routing nodes via the switch fabric; and iii) a first control processor associated with a first one of the plurality of routing nodes capable of generating a first refined redistribution metric associated with a first route in a routing table of the first routing node. The first control processor generates the first refined redistribution metric based on 1) a first default redistribution metric associated with a first routing protocol associated with the first route and 2) a first routing protocol metric received from the first routing protocol associated with the first route.

20 Claims, 10 Drawing Sheets

APPARATUS AND METHOD FOR MULTI-PROTOCOL ROUTE REDISTRIBUTION IN A MASSIVELY PARALLEL ROUTER

CROSS-REFERENCE TO RELATED APPLICATIONS AND CLAIM OF PRIORITY

The present invention is related to those disclosed in: 1) U.S. Provisional Patent Application Ser. No. 60/558,835, filed Apr. 2, 2004, entitled "Multi-Protocol Route Distribution in a Massively Parallel Distributed Router"; 2) U.S. Provisional Patent Application Ser. No. 60/488,197, filed Jul. 17, 2003, entitled "Route Summarization and Distribution in a Massively Parallel Router"; and 3) U.S. patent application Ser. No. 10/832,010, filed Apr. 26, 2004, entitled "Apparatus and Method for Route Summarization and Distribution in a Massively Parallel Router". Provisional Patent Application Ser. Nos. 60/488,197 and 60/558,835 and U.S. patent application Ser. No. 10/832,010 are assigned to the assignee of this application. The subject matter disclosed in Provisional Patent Appl. Ser. Nos. 60/488,197 and 60/558,835 and patent application Ser. No. 10/832,010 are hereby incorporated by reference into the present disclosure as if fully set forth herein. The present invention claims priority under 35 U.S.C. §119(e) to U.S. Provisional Patent Application Ser. No. 60/558,835.

TECHNICAL FIELD OF THE INVENTION

The present invention is generally directed to distributed architecture routers and, in particular, to route redistribution in a massively parallel router that supports multiple routing protocols.

BACKGROUND OF THE INVENTION

There has been explosive growth in Internet traffic due to the increased number of Internet users, various service demands from those users, the implementation of new services, such as voice-over-IP (VOIP) or streaming applications, and the development of mobile Internet. Conventional routers, which act as relaying nodes connected to sub-networks or other routers, have accomplished their roles well, in situations in which the time required to process packets, determine their destinations, and forward the packets to the destinations is usually smaller than the transmission time on network paths. More recently, however, the packet transmission capabilities of high-bandwidth network paths and the increases in Internet traffic have combined to outpace the processing capacities of conventional routers.

This has led to the development of massively parallel, distributed architecture routers. A distributed architecture router typically comprises a large number of routing nodes that are coupled to each other via a plurality of switch fabric modules and an optional crossbar switch. Each routing node has its own routing (or forwarding) table for forwarding data packets via other routing nodes to a destination address.

Traditionally, a single processor is used to forward all packets in a router or switch. Even in routers with multiple forwarding table lookup threads, these threads are under control of a single processor and use a single forwarding table. Thus, conventional routers retain route information in a central location and do not distribute route information within the router. Also, since many prior art routers do not have multiple routing nodes, these routers do not experience the problems that arise when a distributed architecture combines routing nodes with small table space with more powerful routing nodes in a large route capacity router.

Furthermore, conventional routers do not provide any consistent mechanism for multi-protocol route distribution. Various ad-hoc mechanisms for selecting among routes learned through different route metrics are used on a per-instance basis. Typically, this is done by prioritizing the routing protocol types and by selecting the route from the highest priority routing protocol. When routes learned through one routing protocol are distributed to another routing protocol, there is no consistent mechanism for setting the metrics in the target routing protocol. Often only the matching metrics are used. Typically, adjusting the metrics of different routing protocols to optimize for network topology is done manually, leading to manually administered routes. Since prior art routers do not distribute control plane functionality, there has been no need in conventional routers for internal route distribution and route summarization techniques.

Therefore, there is a need in the art for improved high-speed routers. In particular, there is a need for a high-speed, distributed architecture router that is capable of distributing routing information across routes associated with different protocols. More particularly, there is a need for a high-speed, distributed architecture router that compares different metrics from different routing protocols in an effective manner.

SUMMARY OF THE INVENTION

The present invention provides consistent multi-protocol routing and route redistribution in a massively parallel, distributed architecture router in which both the control plane and the data plane functionality are distributed. Multi-protocol route redistribution according to the principles of the present invention enables routes learned through routing protocols using different metrics to be compared in such a way that the best route can be selected, redistributed to other routing protocols, and used to build internal forwarding tables. The present invention proposes a method of comparing routes in a consistent manner through the use of arbitrary metrics called "redistribution metrics". The present invention also provides a method of redistributing the routes so that meaningful metrics are used when a route learned through one routing protocol is redistributed to other routing protocols.

Accordingly, to address the above-discussed deficiencies of the prior art, it is a primary object of the present invention to provide a router for interconnecting external devices coupled to the router. According to an advantageous embodiment of the present invention, the router comprises: i) a switch fabric; ii) a plurality of routing nodes coupled to the switch fabric, wherein each of the plurality of routing nodes is capable of exchanging data packets with the external devices and with other ones of the plurality of routing nodes via the switch fabric; and iii) a first control processor associated with a first one of the plurality of routing nodes capable of generating a first refined redistribution metric associated with a first route in a routing table of the first routing node. The first control processor generates the first refined redistribution metric based on a first default redistribution metric associated with a first routing protocol associated with the first route.

According to one embodiment of the present invention, the first control processor generates the first refined redistribution metric based on a first routing protocol metric received from the first routing protocol associated with the first route.

According to another embodiment of the present invention, the first control processor is further capable of generating a second refined redistribution metric associated with a second route in the routing table of the first routing node, wherein the first control processor generates the second refined redistribution metric based on a second default redistribution metric associated with a second routing protocol associated with the second route.

According to still another embodiment of the present invention, the first control processor generates the second refined redistribution metric based on a second routing protocol metric received from the second routing protocol associated with the second route.

According to yet another embodiment of the present invention, the first and second routes are associated with the same destination address.

According to a further embodiment of the present invention, the first control processor compares the first refined redistribution metric and the second refined redistribution metric and, based on the comparison, selects one of the first and second refined redistribution metrics to be stored in an entry in the routing table associated with the first route.

According to a still further embodiment of the present invention, the first control processor distributes the selected one of the first and second refined redistribution metrics to the other ones of the plurality of routing nodes.

According to a yet further embodiment of the present invention, the first control processor distributes an advertised route metric derived from the selected one of the first and second refined redistribution metrics to the external devices.

In one embodiment of the present invention, the router further comprises a second control processor associated with the switching fabric capable of comparing the selected refined redistribution metric received from the first routing node with a second selected refined redistribution metric received from a second routing node.

In another embodiment of the present invention, the second control processor, based on the comparison, selects one of the selected refined redistribution metric received from the first routing node and the second selected refined redistribution metric received from the second routing node to be distributed to the other ones of the plurality of the routing nodes.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention and its advantages, reference is now made to the following description taken in conjunction with the accompanying drawings, in which like reference numerals represent like parts.

DETAILED DESCRIPTION OF THE INVENTION

FIGS. 1 through 7, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged packet switch or router.

Figure 1:
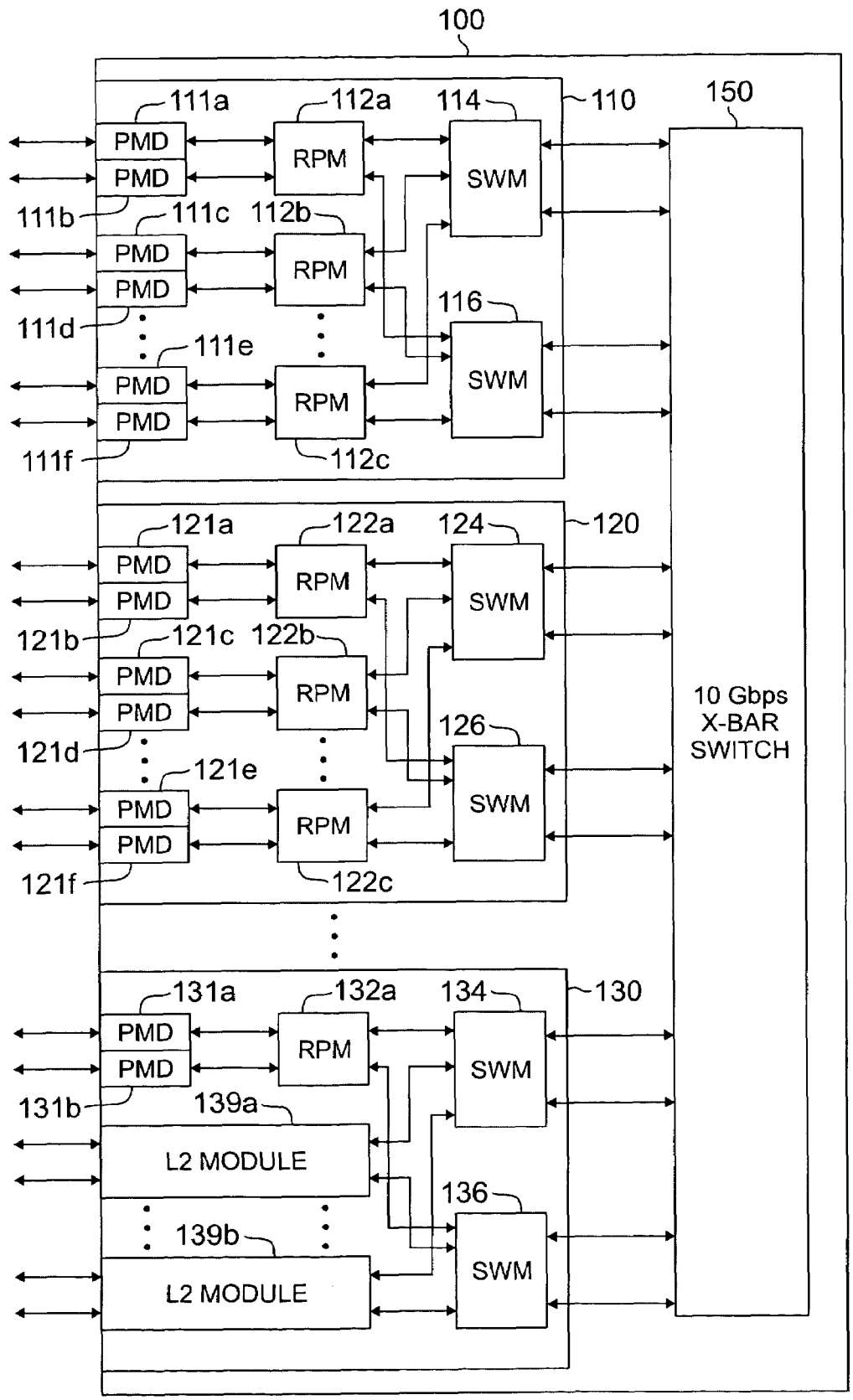
FIG. 1 illustrates an exemplary distributed architecture router, which performs multi-protocol routing and route redistribution according to the principles of the present invention.

FIG. 1 illustrates exemplary distributed architecture router 100, which performs multi-protocol routing and route redistribution according to the principles of the present invention. Router 100 supports Layer 2 switching and Layer 3 switching and routing. Thus, router 100 functions as both a switch and a router. However, for simplicity, router 100 is referred to herein simply as a router. The switch operations are implied.

According to the exemplary embodiment, router 100 comprises N rack-mounted shelves, including exemplary shelves 110, 120 and 130, which are coupled via crossbar switch 150. In an advantageous embodiment, crossbar switch 150 is a 10 Gigabit Ethernet (10 GbE) crossbar operating at 10 gigabits per second (Gbps) per port.

Each of exemplary shelves 110, 120 and 130 may comprise route processing modules (RPMs) or Layer 2 (L2) modules, or a combination of route processing modules and L2 modules. Route processing modules forward data packets using primarily Layer 3 information (e.g., Internet protocol (IP) addresses). L2 modules forward data packets using primarily Layer 2 information (e.g., medium access control (MAC) addresses). For example, the L2 modules may operate on Ethernet frames and provide Ethernet bridging, including VLAN support. The L2 modules provide a limited amount of Layer 3 forwarding capability with support for small forwarding tables of, for example, 4096 routes.

In the exemplary embodiment shown in FIG. 1, only shelf 130 is shown to contain both route processing (L3) modules and L2 modules. However, this is only for the purpose of simplicity in illustrating router 100. Generally, it should be understood that many, if not all, of the N shelves in router 100 may comprise both RPMs and L2 modules.

Exemplary shelf 110 comprises a pair of redundant switch modules, namely primary switch module (SWM) 114 and secondary switch module (SWM) 116, a plurality of route processing modules 112, including exemplary route processing module (RPM) 112a, RPM 112b, and RPM 112c, and a plurality of physical media device (PMD) modules 111, including exemplary PMD modules 111a, 111b, 111c, 111d, 111e, and 111f. Each PMD module 111 transmits and receives data packets via a plurality of data lines connected to each PMD module 111.

Similarly, shelf 120 comprises a pair of redundant switch modules, namely primary SWM 124 and secondary SWM 126, a plurality of route processing modules 122, including RPM 122a, RPM 122b, and RPM 122c, and a plurality of physical media device (PMD) modules 121, including PMD modules 121a-121f. Each PMD module 121 transmits and receives data packets via a plurality of data lines connected to each PMD module 121.

Additionally, shelf 130 comprises redundant switch modules, namely primary SWM 134 and secondary SWM 136, route processing module 132a, a plurality of physical media device (PMD) modules 131, including PMD modules 131a and 131b, and a plurality of Layer 2 (L2) modules 139, including L2 module 139a and L2 module 139b. Each PMD module 131 transmits and receives data packets via a plurality of data lines connected to each PMD module 131. Each L2 module 139 transmits and receives data packets via a plurality of data lines connected to each L2 module 139.

Router 100 provides scalability and high-performance using up to M independent routing nodes (RN). A routing node comprises, for example, a route processing module (RPM) and at least one physical medium device (PMD) module. A routing node may also comprise an L2 module (L2M). Each route processing module or L2 module buffers incoming Ethernet frames, Internet protocol (IP) packets and MPLS frames from subnets or adjacent routers. Additionally, each RPM or L2M classifies requested services, looks up destination addresses from frame headers or data fields, and forwards frames to the outbound RPM or L2M. Moreover, each RPM (or L2M) also maintains an internal routing table determined from routing protocol messages, learned routes and provisioned static routes and computes the optimal data paths from the routing table. Each RPM processes an incoming frame from one of its PMD modules. According to an advantageous embodiment, each PMD module encapsulates an incoming frame (or cell) from an IP network (or ATM switch) for processing in a route processing module and performs framing and bus conversion functions.

Incoming data packets may be forwarded within router 100 in a number of different ways, depending on whether the source and destination ports are associated with the same or different PMD modules, the same or different route processing modules, and the same or different switch modules. Since each RPM or L2M is coupled to two redundant switch modules, the redundant switch modules are regarded as the same switch module. Thus, the term "different switch modules" refers to distinct switch modules located in different ones of shelves 110, 120 and 130.

In a first type of data flow, an incoming data packet may be received on a source port on PMD module 121f and be directed to a destination port on PMD module 131a. In this first case, the source and destination ports are associated with different route processing modules (i.e., RPM 122c and RPM 132a) and different switch modules (i.e., SWM 126 and SWM 134). The data packet must be forwarded from PMD module 121f all the way through crossbar switch 150 in order to reach the destination port on PMD module 131a.

In a second type of data flow, an incoming data packet may be received on a source port on PMD module 121a and be directed to a destination port on PMD module 121c. In this second case, the source and destination ports are associated with different route processing modules (i.e., RPM 122a and RPM 122b), but the same switch module (i.e., SWM 124). The data packet does not need to be forwarded to crossbar switch 150, but still must pass through SWM 124.

In a third type of data flow, an incoming data packet may be received on a source port on PMD module 111c and be directed to a destination port on PMD module 111d. In this third case, the source and destination ports are associated with different PMD modules, but the same route processing module (i.e., RPM 112b). The data packet must be forwarded to RPM 112b, but does not need to be forwarded to crossbar switch 150 or to switch modules 114 and 116.

Finally, in a fourth type of data flow, an incoming data packet may be received on a source port on PMD module 111a and be directed to a destination port on PMD module 111a. In this fourth case, the source and destination ports are associated with the same PMD module and the same route-processing module (i.e., RPM 112a). The data packet still must be forwarded to RPM 112a, but does not need to be forwarded to crossbar switch 150 or to switch modules 114 and 116.

Figure 2:
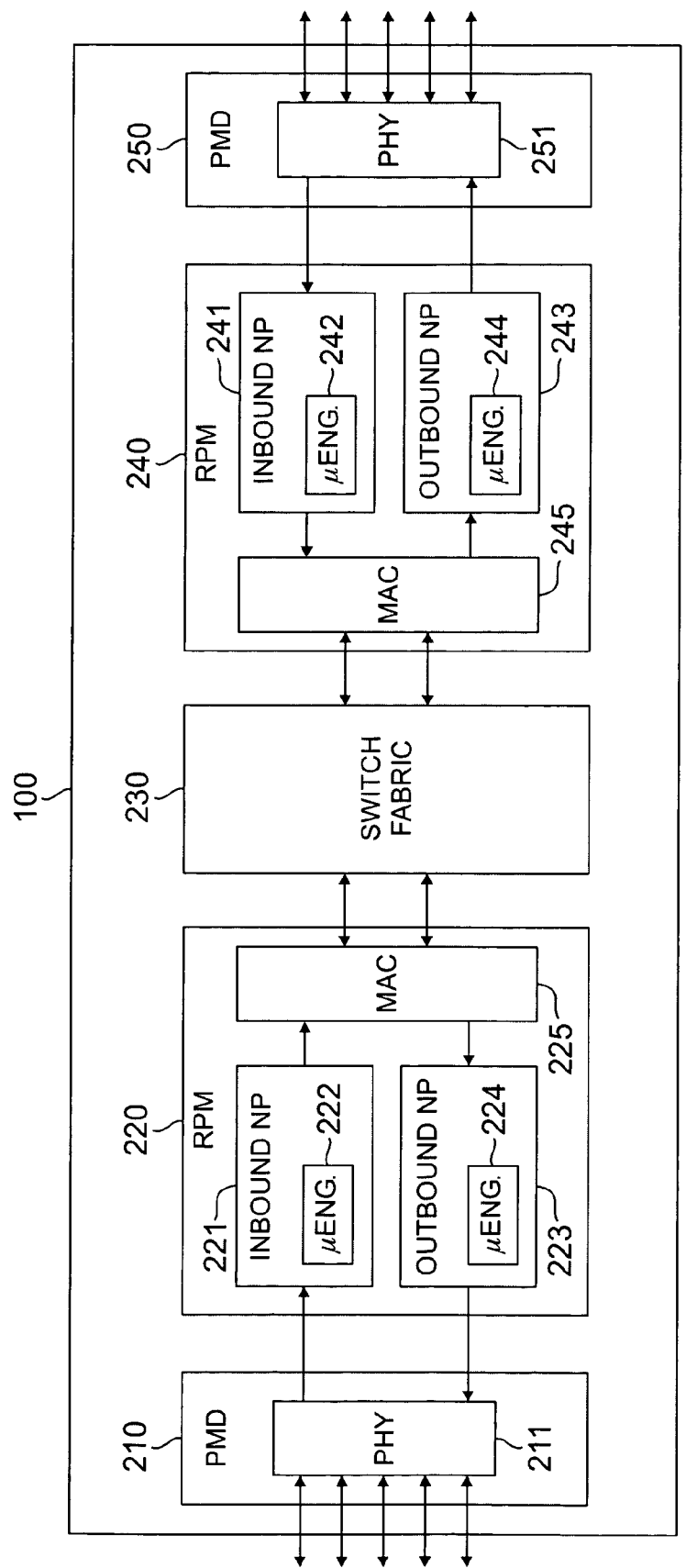
FIG. 2 illustrates selected portions of the exemplary router according to one embodiment of the present invention.

FIG. 2 illustrates selected portions of exemplary router 100 in greater detail according to one embodiment of the present invention. FIG. 2 simplifies the representation of some of the elements in FIG. 1. Router 100 comprises PMD modules 210 and 250, route processing modules 220 and 240, and switch fabric 230. PMD modules 210 and 250 are intended to represent any of PMD modules 111, 121, and 131 shown in FIG. 1. Route processing modules 220 and 240 are intended to represent any of RPM 112, RPM 122, and RPM 132 shown in FIG. 1. Switch fabric 230 is intended to represent crossbar switch 150 and the switch modules in shelves 110, 120 and 130 in FIG. 1.

PMD module 210 comprises physical (PHY) layer circuitry 211, which transmits and receives data packets via the external ports of router 100. PMD module 250 comprises physical (PHY) layer circuitry 251, which transmits and receives data packets via the external ports of router 100. RPM 220 comprises inbound network processor (NP) 221, outbound network processor (NP) 223, and medium access controller (MAC) layer circuitry 225. RPM 240 comprises inbound network processor (NP) 241, outbound network processor (NP) 243, and medium access controller (MAC) layer circuitry 245.

Each network processor comprises a plurality of microengines capable of executing threads (i.e., code) that forward data packets in router 100. Inbound NP 221 comprises N microengines (μEng.) 222 and outbound NP 223 comprises N microengines (μEng.) 224. Similarly, inbound NP 241 comprises N microengines (μEng.) 242 and outbound NP 243 comprises N microengines (μEng.) 244.

Two network processors are used in each route-processing module to achieve high-speed (i.e., 10 Gbps) bi-directional operations. Inbound network processors (e.g., NP 221, NP 241) operate on inbound data (i.e., data packets received from the network interfaces and destined for switch fabric 230). Outbound network processors (e.g., NP 223, NP 243) operate on outbound data (i.e., data packets received from switch fabric 230 and destined for network interfaces).

According to an exemplary embodiment of the present invention, each network processor comprises N=16 microengines that perform data plane operations, such as data packet forwarding. Each RPM also comprises a control plane processor (not shown) that performs control plane operations, such as building forwarding (or look-up) tables. According to the exemplary embodiment, each microengine supports eight threads. At least one microengine is dedicated to reading inbound packets and at least one microengine is dedicated to writing outbound packets. The remaining microengines are used for forwarding table lookup operations.

In order to meet the throughput requirements for line rate forwarding at data rates up to 10 Gbps, it is necessary to split the data plane processing workload among multiple processors, microengines, and threads. The first partitioning splits the workload between two network processors—one operating on inbound data packets from the network interfaces to the switch and the other operating on outbound data packets from the switch to the network interfaces. Each of these processors uses identical copies of the forwarding table.

According to an exemplary embodiment of the present invention, the control and management plane functions (or operations) of router 100 may be distributed between inbound (IB) network processor 221 and outbound network processor 223. The architecture of router 100 allows distribution of the control and management plane functionality among many processors. This provides scalability of the control plane in order to handle higher control traffic loads than traditional routers having only a single control plane processor. Also, distribution of the control and management plane operations permits the use of multiple low-cost processors instead of a single expensive processor. For simplicity in terminology, control plane functions (or operations) and management plane functions (or operations) may hereafter be collectively referred to as control plane functions.

Figure 3:
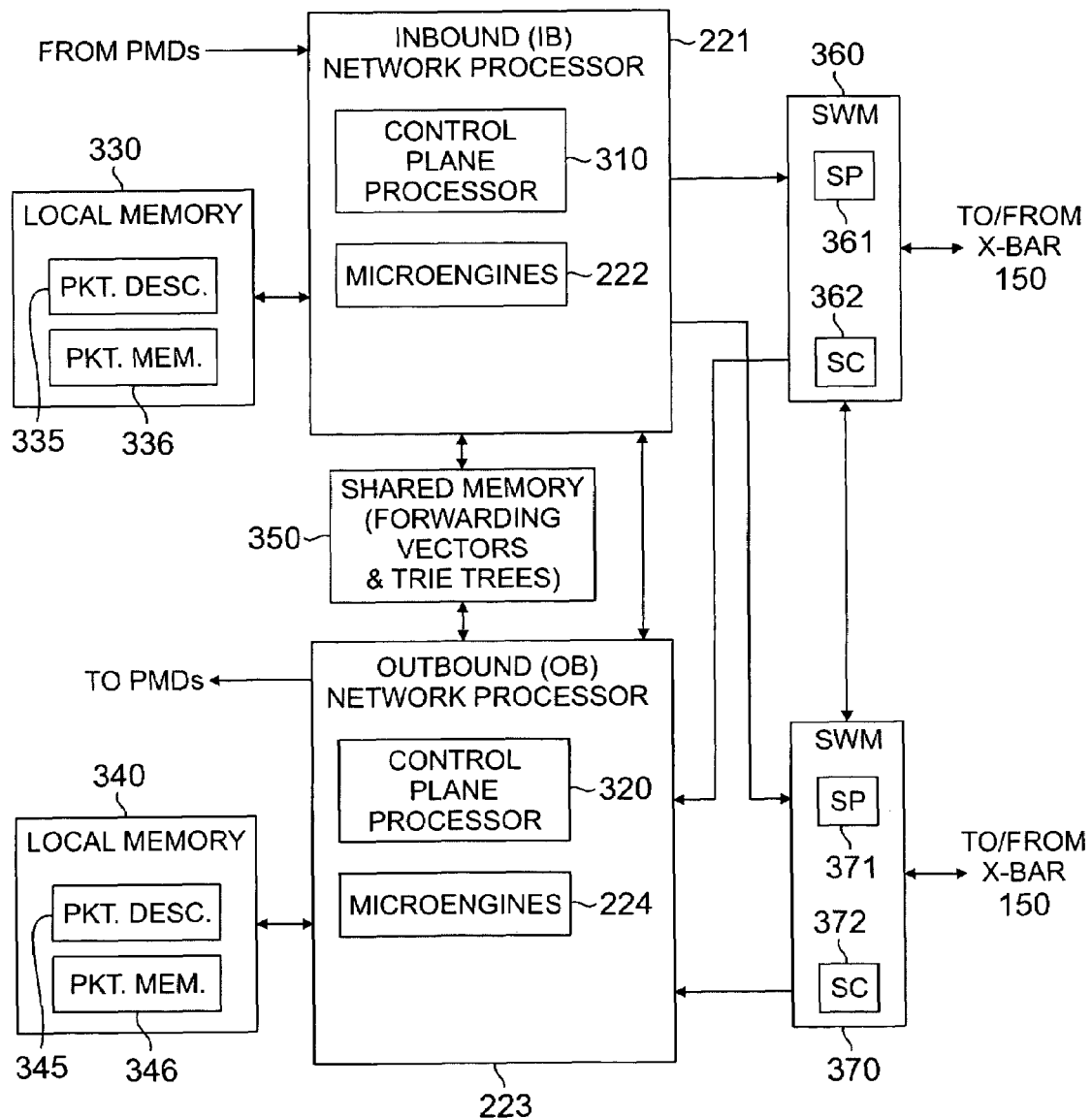
FIG. 3 illustrates the inbound network processor and outbound network processor according to an exemplary embodiment of the present invention.

FIG. 3 illustrates inbound network processor 221 and outbound network processor 223 according to an exemplary embodiment of the present invention. Inbound (IB) network processor 221 comprises control plane processor 310 and microengine(s) 222. Outbound (OB) network processor 223 comprises control plane processor 320 and microengine(s) 224. Inbound network processor 221 and outbound network processor 223 are coupled to shared memory 350, which stores forwarding table information, including forwarding vectors and trie tree search tables.

Inbound network processor 221 is coupled to local memory 330, which contains packet descriptors 335 and packet memory 336. Outbound network processor 223 is coupled to local memory 340, which contains packet descriptors 345 and packet memory 346.

Control and management messages may flow between the control and data planes via interfaces between the control plane processors and data plane processors. For example, control plane processor 310 may send control and management messages to the microengines 222 and control plane processor 320 may send control and management messages to the microengines 224. The microengines can deliver these packets to the local network interfaces or to other RPMs for local consumption or transmission on its network interfaces. Also, the microengines may detect and send control and management messages to their associated control plane processor for processing. For example, microengines 222 may send control and management plane messages to control plane processor 310 and microengines 224 may send control and management messages to control plane processor 320.

Inbound network processor 221 operates under the control of control software (not shown) stored in memory 330. Similarly, outbound network processor 223 operates under the control of control software (not shown) stored in memory 340. According to an exemplary embodiment of the present invention, the control software in memories 330 and 340 may be identical software loads.

Network processors 221 and 223 in router 100 share routing information in the form of aggregated routes stored in shared memory 350. Management and routing functions of router 100 are implemented in inbound network processor 221 and outbound network processor 223 in each RPM of router 100. Network processors 221 and 223 are interconnected through Gigabit optical links to exemplary switch module (SWM) 360 and exemplary switch module (SWM) 370. SWM 360 comprises switch processor 361 and switch controller 362. SWM 370 comprises switch processor 371 and switch controller 372. Multiple switch modules may be interconnected through 10 Gbps links via Rack Extension Modules (REXMs) (not shown).

In order to meet the bi-directional 10 Gbps forwarding throughput of the RPMs, two network processors—one inbound and one outbound—are used in each RPM. Inbound network processor 221 handles inbound (IB) packets traveling from the external network interfaces to switch fabric 230. Outbound network processor 223 handles outbound (OB) packets traveling from switch fabric 230 to the external network interfaces. In an exemplary embodiment of the present invention, control plane processor (CPP) 310 comprises an XScale core processor (XCP) and microengines 222 comprise sixteen microengines. Similarly, control plane processor (CPP) 320 comprises an XScale core processor (XCP) and microengines 224 comprise sixteen microengines.

According to an exemplary embodiment of the present invention, router 100 implements a routing table search circuit as described in U.S. patent application Ser. No. 10/794,506, filed on Mar. 5, 2004, entitled "Apparatus and Method for Forwarding Mixed Data Packet Types in a High-Speed Router." The disclosure of U.S. patent application Ser. No. 10/794,506 is hereby incorporated by reference in the present application as if fully set forth herein. The routing table search circuit comprises an initial content addressable memory (CAM) stage followed by multiple trie tree search table stages. The CAM stage allows searches to be performed on data packet header information other than regular address bits, such as, for example, class of service (COS) bits, packet type bits (IPv4, IPv6, MPLS), and the like.

The use of multiple threads in multiple microengines enables network processors 221 and 223 to modify a data packet during its transit through router 100. Thus, network processors 221 and 223 may provide network address translation (NAT) functions that are not present in conventional high-speed routers. This, in turn, provides dynamic address assignment to nodes in a network. Since network processors 221 and 223 are able to modify a data packet, network processors 221 and 223 also are able to obscure the data packet identification. Obscuring packet identification allows router 100 to provide complete anonymity relative to the source of an inbound packet.

The ability of router 100 to distribute the data packet workload over thirty-two microengines, each capable of executing, for example, eight threads, enables router 100 to perform the additional security and classification functions at line rates up to 10 Gbps. FIG. 3 shows the flow of data through route processing module (RPM) 220. Packets enter RPM 220 through an interface—a network interface (PMD) for inbound network processor (IB NP) 221 and a switch interface for outbound network processor (OB NP) 223. IB NP 221 and OB NP 223 also may receive packets from control plane processors 310 and 320.

Microengines 222 store these data packets in packet memory 336 in local QDRAM (or RDRAM) memory 330 and write a Packet Descriptor into packet descriptors 335 in local memory 330. Similarly, microengines 224 store these data packets in packet memory 346 in local QDRAM (or RDRAM) memory 340 and write a Packet Descriptor into packet descriptors 345 in local memory 340.

A CAM search key is built for searching the initial CAM stages of the search tables in memory 350. The CAM key is built from data packet header information, such as portions of the destination address and class of service (CoS) information and a CAM lookup is done. The result of this lookup gives an index for a Vector Table Entry, which points to the start of a trie tree search table. Other information from the packet header, such as the rest of the destination address and possibly a socket address, are used to traverse the trie tree search table.

The search of the CAM stage and trie tree table results in either in a leaf or an invalid entry. Unresolved packets are either dropped or sent to control plane processors 310 and 320 for further processing. A leaf node gives a pointer to an entry in a forwarding table (i.e., a Forwarding Descriptor) in memory 350. Since shared memory space is limited, these forwarding tables may be located in local memory 330 and 340. Based on the results of the search, the packet is forwarded to the control plane, to another RPM network processor, to an L2 module or to an output port (i.e., a switch port for IB NP 221 and a network interface port for OB NP 223). The data packet is not copied as it is passed from microengine thread to microengine thread. Only the pointer to the Packet Descriptor must be passed internally. This avoids expensive copies.

According to the illustrated embodiment, router 100 distributes the routing and forwarding functions among many routing nodes. To reduce the control plane communications bandwidth required for the internal distribution of routes, router 100 aggregates routes using a route summarization mechanism according to the principles of the present invention. Router 100 also supports summarization of external routes to allow internal routing nodes with limited table space to be used within router 100 and to reduce the forwarding table size requirements and forwarding lookup depth. Some of the routing nodes (i.e., the L2 nodes) have small size Layer 3 forwarding tables, so aggressive route summarization supports the large route capacity (nominally, one million routes) provided by router 100.

As noted above, router 100 implements an "always route" approach, in which data packets are sent to an external router that is expected to have more information about how to route the data packet. Use of aggressive route summarization, together with the "always route" approach, allows a reduction in forwarding table size. This reduces the amount of expensive, high-speed memory needed and avoids (or diminishes) the board layout limitations and complexity associated with high-speed memory devices.

Router 100 shares routing information in the form of aggregated routes among all of the RPM and L2M routing engines. Each routing node sends its route information to the Master SWM, which distributes it to all of the routing nodes. To reduce the control plane bandwidth needed to distribute the routing information within router 100 and to reduce the forwarding table size required in each routing node, aggregated routes are used. To meet the limited Layer 3 forwarding capability of the L2Ms aggressive route summarization is needed.

According to an exemplary embodiment of the present invention, the control plane processors in router 100 (e.g., switch processor (SP) 361 in SWM 360, SP 371 in SWM 370, CPP 310 in IB NP 221, CPP 320 in OB NP 223, system processors of the L2 modules) perform the route summarization functions. Typically, the routing protocols run in CPP 310 of IB NP 221, although each protocol may be allocated to either of IB NP 221 or OB NP 223.

The RPM and L2 module control plane processors build the forwarding tables used by the data plane processors. In the case of the RPMs, one of the network processors—typically the inbound network processor—builds the forwarding tables with support from the other network processor. Microengines 222 in IB NP 221 and microengines 224 in OB NP 223 use the forwarding tables to forward packets. The L2 modules learn Layer 2 routes from the traffic and from a Rapid Spanning Tree Protocol (RSTP). The switch processor builds Layer 3 routes and hardware performs the packet forwarding.

Route summarization according to the principles of the present invention amounts to shortening the prefix used in forwarding the packet. In other words, router 100 drops some of the least significant subnet bits. This process also is called route aggregation, since many routes are combined into a single route. The control software executed by the control plane processor (e.g., CPP 310) of each RPM and L2 module sends the learned Layer 3 routes to a Master switch module (SWM). One of the switch modules (e.g., SWM 360, or SWM 370) may be designated as the master switch module. The control plane processors in the RPMs and in the L2Ms perform route summarization on routes they learned through their routing protocols, through provisioning, and through internal route distribution via the Master SWM. All routes to the same RPM may be summarized in other RPMs and L2Ms since it only is necessary to deliver packets to the RPM associated with the destination port. The destination RPM can deliver them to the correct port. Also, routes to the same local output port may be summarized. The Master SWM does internal route summarization and sends the aggregated (or summarized) routes to all the RPMs and L2 modules. These summarized routes can be distributed via broadcast or unicast messaging by the Master SMW. The RPMs and L2 modules then build the forwarding table entries for these summarized routes.

To better illustrate route summarization according to the principles of the present invention, an example is now described for IPv4 data packet forwarding. However, it should be understood that similar techniques apply to other packet types, such as IPv6 and MPLS.

Figure 4A:
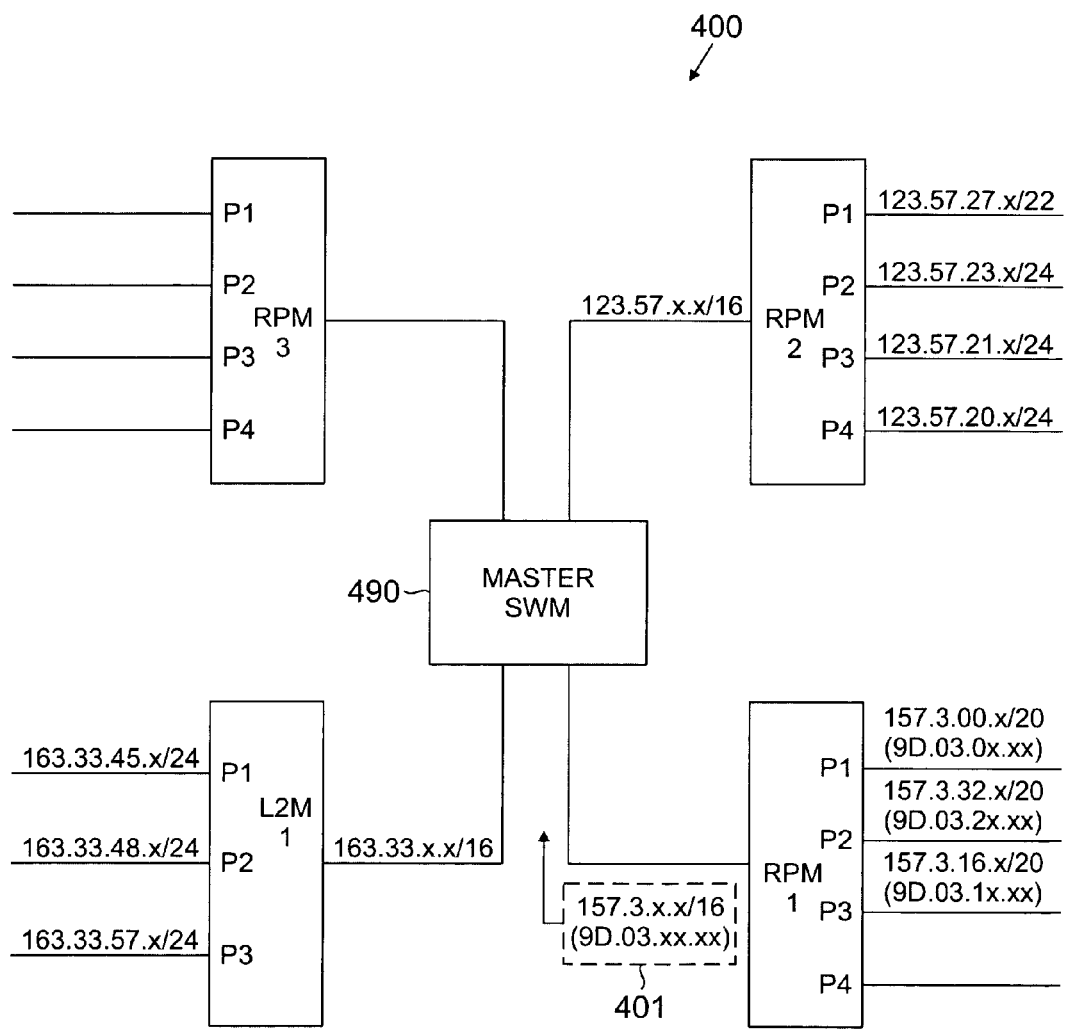
FIGS. 4A-4D illustrate internal route summarization according to the principles of the present invention.

FIGS. 4A-4D illustrate internal route summarization according to the principles of the present invention. In FIG. 4A, three route processing modules, labeled RPM 1, RPM 2 and RPM 3, and a Layer 2 module, labeled L2M 1, are shown coupled to master switch module (SWM) 490. Master SWM 490 may be any one of switch modules 114, 116, 124, 126, 134, 136 in the routing nodes of router 100. The external interfaces show the subnets supported on each port (P1, P2, P3, etc.) and the internal interfaces to master SWM 490 show the mapping of subnets to each RPM and L2M. In FIGS. 4A-4D, master SWM 490 is the device that determines and distributes the internal subnet masks for each RPM and L2M.

In FIG. 4A, RPM 1, RPM 2, RPM 3 and L2M 1 are in initial state 400. In initial state 400, RPM 1 already has three routes, one each on ports P1, P2 and P3. The routes are represented as a subnet mask in decimal format and in hexadecimal format (in parentheses). Port P1 of RPM 1 is associated with a route having the external 20-bit subnet mask 157.3.00.x/20 (9D.03.0x.xx). Port P2 of RPM 1 is associated with a route having the external 20-bit subnet mask 157.3.32.x/20 (9D.03.2x.xx). Port P3 of RPM 1 is associated with a route having the external 20-bit subnet mask 157.3.16.x/20 (9D.03.1x.xx). Port P4 of RPM 1 is not yet associated with a route.

In initial state 400, RPM 3 has no routes. On RPM 2, Ports P1, P2, P3 and P4 are associated with routes having the external 22-bit and 24-bit subnet masks 123.57.27.x/22, 123.57.23.x/24, 123.57.21.x/24, and 123.57.20.x/24, respectively. On L2M 1, Ports P1, P2 and P3 are associated with routes having the external 24-bit subnet masks 163.33.45.x/24, 163.33.48.x/24 and 163.33.57.x/24, respectively.

In initial state 400, the external subnet masks for RPM 1 are 20 bits in length, but the internal subnet mask 401 determined by the control plane processor of RPM 1 or by the master SWM 490 is 16 bits in length. If these routes were learned directly by RPM 1 through provisioning or via routing protocols operating in RPM 1, then RPM 1 can summarize them before sending them to the Master SWM. If these routes were learned by different RPMs, then the individual RPMs send the component routes to the Master SWM, which performs the summarization. The initial internal subnet mask 401 for RPM 1 is 157.3.x.x/16 (9D.03.xx.xx). Similarly, the initial internal subnet mask for RPM 2 is 123.57.x.x/16 and the initial internal subnet mask for L2M 1 is 163.33.x.x/16. In the remainder of this example, new routes will be added only to RPM 1 and RPM 3 and the internal subnet masks for RPM 2 and L2M 1 will remain unchanged.

In initial state 400, RPM 3, RPM 2 and L2M 1 send any packets having a prefix starting with 157.3 to RPM 1. Thus, the forwarding tables of RPM 3, RPM 2 and L2M 1 have only a single entry with a mask of length 16 for RPM 1. This allows RPM 3, RPM 2 and L2M 1 to deliver packets correctly to RPM 1. RPM 1 has three entries in its forwarding table, each with a mask of 20 bits. This permits RPM 1 to deliver packets to the correct interface. Thus, there is a saving of 2 routes in all of the forwarding tables, except for the RPM 1 table. Control plane bandwidth is conserved, since only one route for RPM 1 must be distributed. Similar savings occur for the RPM 2 and L2M 1 routes. In addition to saving forwarding table space, this summarization reduces the workload on the data plane processors by reducing the number of stages in the tree search by one, since there is one less nibble in the prefix.

Figure 4B:
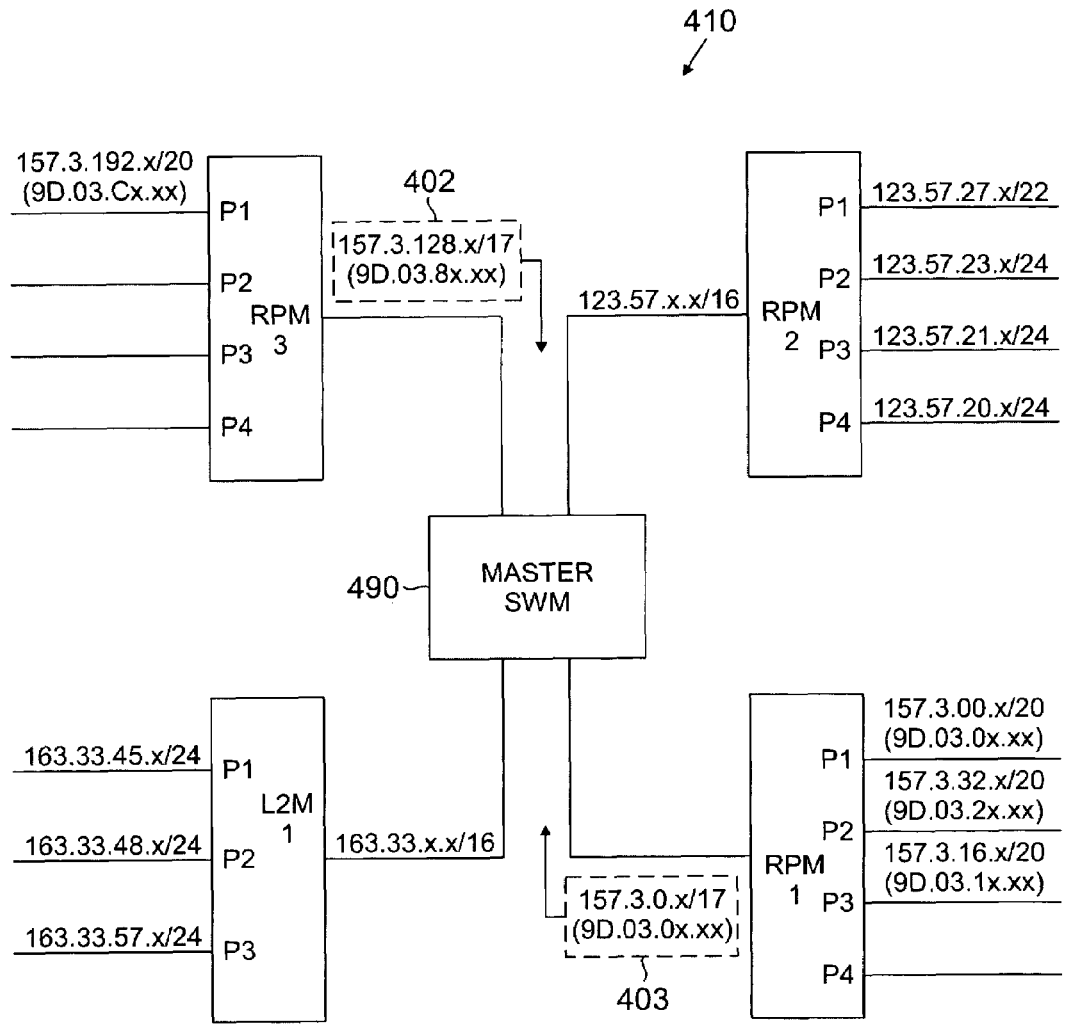

In FIG. 4B, RPM 1, RPM 2, RPM 3 and L2M 1 have entered a second state, namely state 410. In state 410, RPM 3 has learned a first route (on Port P1). Port P1 of RPM 3 is associated with a route having the external 20-bit subnet mask 157.3.192.x/20 (9D.03.Cx.xx). At this point, RPM 1 and RPM 3 both have routes beginning with the 16-bit prefix 157.3 (9D.03), so it is necessary to further differentiate these routes internally. If the master SWM summarized these routes, it will recompute the summarized routes and distribute them. If RPM 1 summarized these routes, it will recognize a conflict by the new route distributed by the master SWM and either recompute the summarized routes or send its component routes to master SWM 490 for summarization. In this example it is assumed that master SWM is performing the summarization.

The internal subnet mask 402 for RPM 3 is 157.3.128.x/17 (9D.03.8x.xx). Master SWM 490 modifies the internal subnet mask 401 of RPM 1 by adding one more bit to give the new internal 17-bit subnet mask 403. The new internal subnet mask 403 for RPM 1 is 157.3.0.x/17 (9D.03.0x.xx). The third byte of mask 403 is 0xxx xxxx for RPM 1 and the third byte of mask 402 is 1xxx xxxx for RPM 3. Now each RPM and L2M can deliver packets with a 157.3.x.x prefix to the correct RPM. There still is a savings in the number of internal routes because the three routes known to RPM 1 are reduced to 1 route for the other RPMs and L2Ms. As before, the other RPMs and L2Ms only need to get the data packets to the correct RPM and the RPM gets the data packet to the correct port.

Figure 4C:
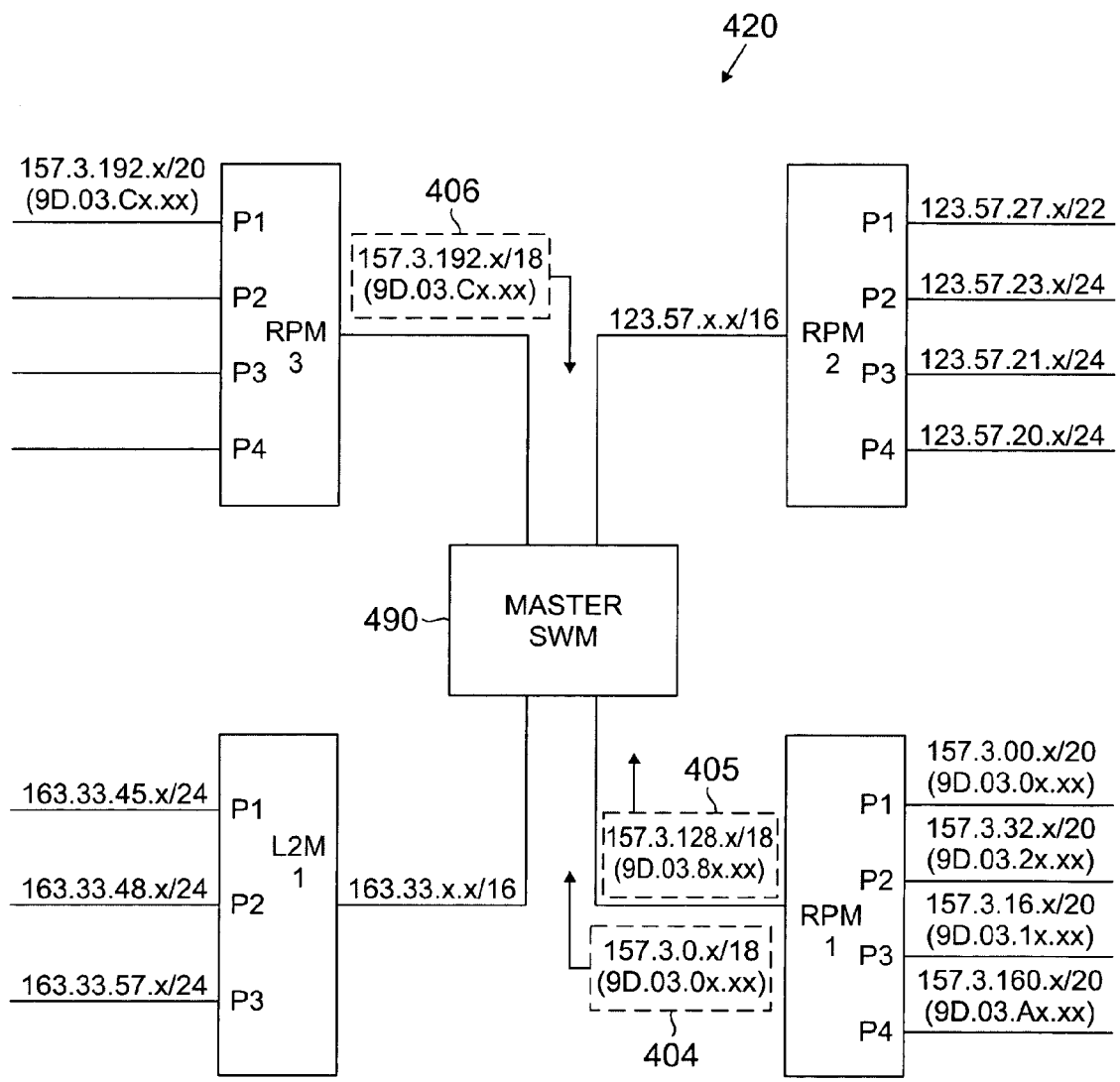

In FIG. 4C, RPM 1, RPM 2, RPM 3 and L2M 1 are in a third state, namely state 420. In state 420, RPM 1 has learned a fourth route (on Port P4). Port P4 of RPM 1 is associated with a route having the external 20-bit subnet mask 157.3.160.x/20 (9D.03.Ax.xx). This route conflicts with the RPM 3 prefix, so master SWM 490 makes additional changes to the internal routes to resolve this conflict. The conflict may be resolved by noting that the first two bits of the third byte are 11 for RPM 3 and are either 00 or 10 for RPM 1. Thus, master SWM 490 changes the prefixes to 18 bit prefixes.

In this case, RPM 3 still only needs one route, but RPM 1 needs two routes, to cover the two cases for the first two bits of the third byte. Thus, master SWM 490 replaces the internal subnet mask 403 of RPM 1 with two new internal 18-bit subnet masks 404 and 405. The new internal subnet mask 404 for RPM 1 is 157.3.0.x/18 (9D.03.0x.xx). The new internal subnet mask 405 for RPM 1 is 157.3.128.x/18 (9D.03.8x.xx). Master SWM 490 also replaces the internal subnet mask 402 of RPM 3 with new internal 18-bit subnet mask 406. The new internal subnet mask 406 for RPM 3 is 157.3.192.x/18 (9D.03.Cx.xx).

There still is a savings, in that each RPM and L2M in the system only needs two routes for RPM 1, instead of four, thus conserving forwarding table space in each of the other RPMs and L2Ms. In addition, only two routes must be distributed for RPM 1, instead of four, thus conserving control plane bandwidth.

Figure 4D:
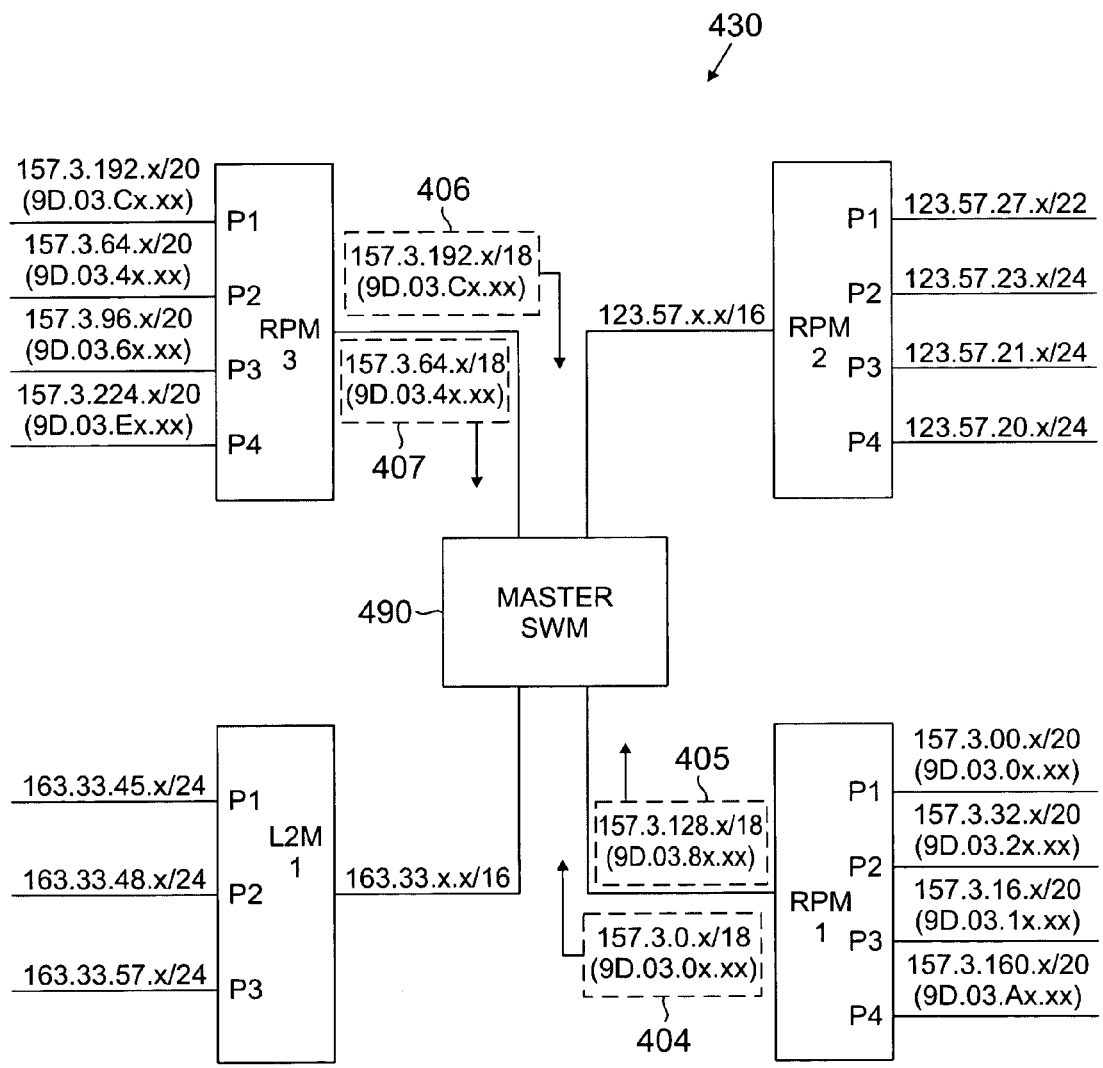

In FIG. 4D, RPM 1, RPM 2, RPM 3 and L2M 1 are in a fourth state, namely state 430. In state 430, RPM 3 has learned three new routes (on Ports P2, P3 and P4). Now, for some of the routes on RPM 3, the first two bits of the third byte are 01. Thus, a new internal subnet mask is needed for RPM 3. Master SWM 490 adds a new internal subnet mask 407 for RPM 3. The new internal subnet mask 407 for RPM 3 is 157.3.64.x/18 (9D.03.4x.xx). Now the savings is two prefixes for RPM 1 and two prefixes for RPM2.

L2M 1 has limited table space and may be subjected to more aggressive summarization. For example, L2M 1 may use a 16-bit mask, 157.3.x.x/16 (9D.03.xx.xx), for all of states 400, 410, 420 and 430. Thus, the L2M makes forwarding mistakes by forwarding RPM 3 packets to RPM 1. Since RPM 1 has more complete knowledge of the prefix, it corrects the mistake and forwards the packet on to RPM 3. Thus, the problem is corrected at the expense of one extra hop through router 100.

Advantageously, if internal route summarization reduces the number of nibbles in the prefix, then it also reduces the number of required stages in the trie tree search. This reduces the workload on the data plane processors in forwarding packets.

Figure 5:
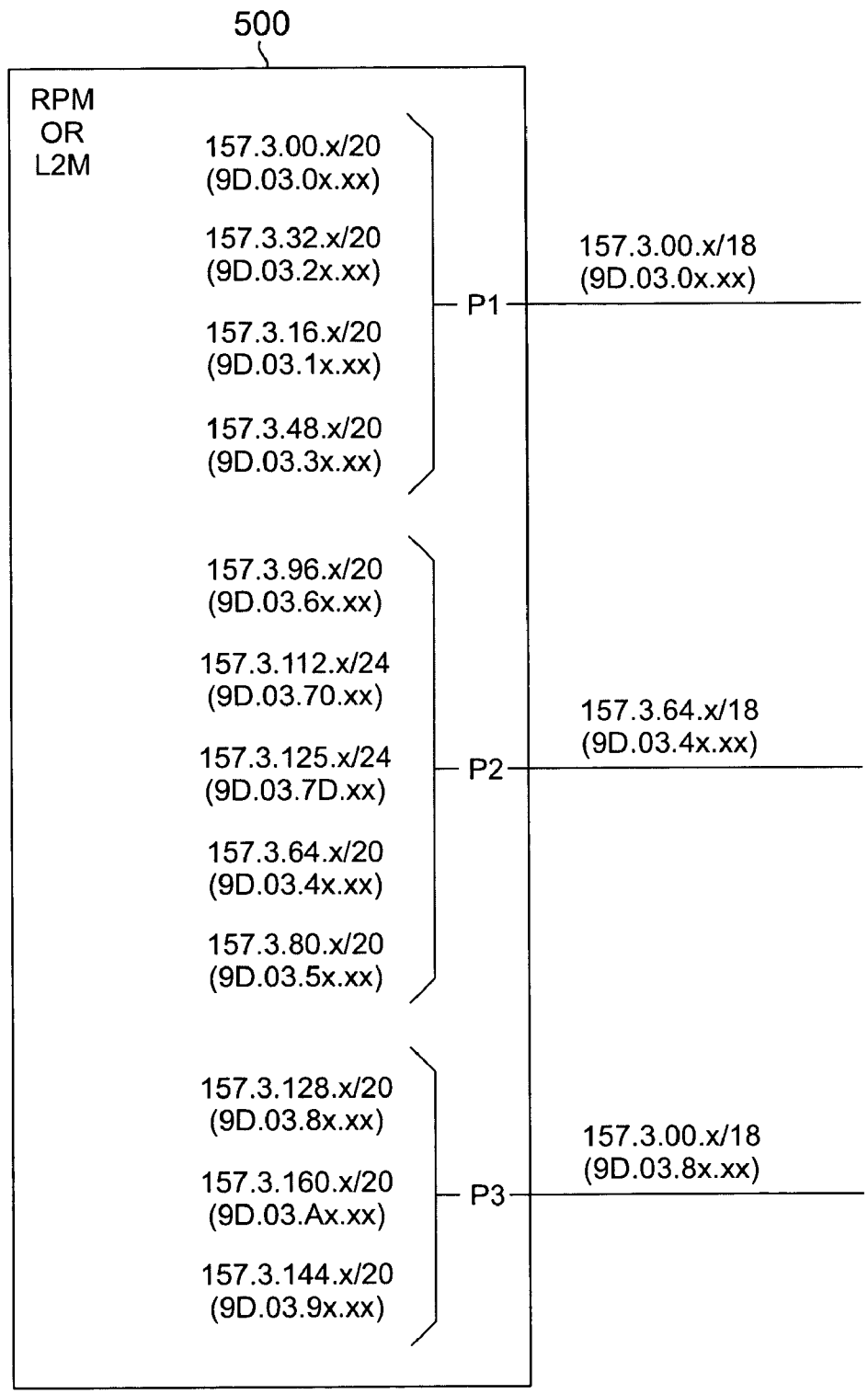
FIG. 5 illustrates external route summarization according to the principles of the present invention.

FIG. 5 illustrates external route summarization according to the principles of the present invention. In FIG. 5, module 500 may represent either a route processing module (RPM) or a Layer 2 (L2) module, as described above. External route summarization is similar to internal route summarization in that it amounts to shortening the prefix used in forwarding the data packet. However, unlike internal route summarization, external route summarization may be visible to the external networks coupled to router 100. The control plane processor (CPP) in the RPM or the L2M that builds the forwarding table performs external route summarization.

In FIG. 5, the port markings external to module 500 show the forwarding table entry associated with each port (e.g., P1, P2, P3) and the routes listed inside the RPM or L2M block show the routes learned by the RPM or L2M. The port markings represent the prefixes of all of the routes that are output to the port. The examples in this section are for IPv4 forwarding, but similar techniques apply to other packet types, such as IPv6 and MPLS.

The first type of external route summarization performed by module 500 is simple aggregation, wherein a complete set of routes of a given mask length are summarized into a single route with a shorter mask. Port 1 illustrates this type of summarization. On Port 1, four internal routes, each with a 20-bit prefix, are summarized into a single route with an 18-bit prefix. The 20-bit internal prefixes begin with the same two bytes, namely [9D.03. . . . ]. The third bytes for the four internal routes are [0000xxxx], [0001xxxx], [0010xxxx] and [0011xxxx]. Since the first two bits of all of the third bytes are all [00], the external 18-bit prefix begins with the 3-byte sequence [9D.03.0x . . . ], where the third byte is equal to [00xxxxxx]. Since all of the possible subnets of the main 18-bit prefix are known, there is no misrouting. The same packets will be delivered to the interface regardless of whether the summarization is done and no extra packets are sent to the interface.

The Port P1 example allows a reduction of the routing table size from four entries to a single entry. If the reduction had been from 20 bits to 16 bits, instead of from 20 to 18 bits, it also would have resulted in traversing one less stage in the forwarding table tree, thus improving throughput.

The routing protocol might be expected to do this simple aggregation, making summarization by router 100 unnecessary. While this might be true if all routes are learned by the same routing protocol, it may not be true if the routes were learned through different routing protocols or if some of the routes were provisioned.

The second type of summarization is more aggressive. The second type of summarization allows some packets to be forwarded that otherwise would be dropped or sent to the default route. It is characterized by defining a port to which to send extra packets that would otherwise be dropped or sent to a default route. The extra packets belong to a subnet that is a superset of the component subnets. That is, the subnet of the extra packets has a prefix that is shorter than the prefix of the forwarding subnet, but whose prefix matches the most significant portion of only one other forwarding table entry. Ports P2 and P3 in FIG. 3 are examples of the second type of summarization. Sending these packets to a best match port is a mild form of the "always route" philosophy.

In the case of Port P2, three of the four 20-bit sub-prefixes of the 18 bit prefix are fully defined. That is, for the three routes having 20-bit prefixes beginning with [9D.03.4x.xx], [9D.03.5x.xx], and [9D.03.6x.xx], the third bytes are [0100xxxx], [0101xxxx], and [0110xxxx]. A fourth route beginning with [9D.03.7x.xx] is missing, wherein the third byte is [0111xxxx]. The fourth 18-bit prefix is only partially defined. It is divided into two 24-bit prefixes, [9D.03.70.xx] and [9D.03.7D.xx], which cover only two of the sixteen possible sub-prefixes. However, if it is assumed that routes beginning with [9D.03.7x.xx] are associated with Port P2, then the first two bits of all of the third bytes are all [01] and the external 18-bit prefix for Port P2 begins with the 3-byte sequence [9D.03.4x . . . ], where the third byte is equal to [01xxxxxx].

In the first level of summarization, the two 24-bit prefixes are treated like a single 20-bit prefix. Then, a second level of summarization is done using the first summarization technique, resulting in an 18-bit prefix. The only external effect of this summarization is that packets for the missing fourteen 24-bit prefixes having third bytes between 70 and 7F are sent out Port P2. However, these packets are sent along a path that is likely to know more about them, since the routers on this path already know about routes with similar prefixes (i.e., [9D.03.70.xx] and [9D.03.7D.xx]). This summarization reduces the number of routes in the forwarding table from five to one. It also reduces the number of stages in the tree search by one for the routes with the 24 bit prefix, since tree stages are based on nibbles and there is one less nibble.

The example shown on Port P3 is similar, except one of the subnets is entirely missing, instead of being partially missing. In this case, routes beginning with [9D.03.8x.xx], [9D.03.9x.xx], and [9D.03.Ax.xx] are defined, where the third bytes are [1000xxxx], [1001xxxx], and [1010xxxx], respectively. However, there are no routes beginning with [9D.03.Bx.xx], where the third byte is [1011xxxx].

This case is handled just like the Port P2 case. The fact that a subnet is missing is ignored. The packets for the missing subnet are assumed to be associated with Port P3 and are sent out Port P3. If it is assumed that routes beginning with [9D.03.Bx.xx] are associated with Port P3, then the first two bits of all of the third bytes are all [10] and the external 18-bit prefix for Port P2 begins with the 3-byte sequence [9D.03.8x . . . ], where the third byte is equal to [10xxxxxx] . In this case, the number of routes in the forwarding table is reduced from three to one.

The third type of summarization is an even more aggressive form of summarization. In this case, packets with unknown routes are sent out a best match port that has no known component routes. The port is selected from prefixes that match to a smaller depth. This method of summarization is similar to a default route, but does use some prefix information to determine the port. This is a more aggressive form of the "Always Route" philosophy.

By way of example, the third type of summarization is illustrated by a default route associated with Port P1 that begins with the 16-bit prefix [9D.03.xx.xx]. Port P1 is already associated with the external 18-bit prefix [9D.03.0x.xx], wherein the third byte is [00xxxxxx]. Port P2 is already associated with the external 18-bit prefix [9D.03.4x.xx], wherein the third byte is [01xxxxxx]. Port P3 is already associated with the external 18-bit prefix [9D.03.8x.xx], wherein the third byte is [10xxxxxx]. The only external prefix missing is the 18-bit prefix [9D.03.Cx.xx], wherein the third byte is [11xxxxxx].

Three of the four 18-bit prefixes are assigned to ports, but there is no routing information available on the fourth prefix. All three of the 18-bit prefixes match the fourth 18-bit prefix to an equal depth (16 bits). Thus, the port for this subnet is chosen arbitrarily, namely Port P1. Typically, it is chosen to be the first route in the previous trie tree stage of the forwarding search tables. In this case, packets with unknown routes are sent out a best match port that is not unique. The port is selected arbitrarily among prefixes that match to an equal depth. Since a longest prefix match is used, only the packets not matching any of the longer 18-bit prefix routes will use this 16-bit default route.

There is one other form of an "Always Route" technique that is used in many conventional routers: a default route. This is a path to an external router to which the current router sends all packets that it does not know how to handle. Packets that do not match any known routes are sent to this default route if one is defined and are dropped if a default route is not defined. Router 100 supports this type of default route. However, router 100 uses the summarization techniques described above to choose more likely routes than the traditional default route.

Internal route summarization allows router 100 to conserve forwarding table space, as well as control plane bandwidth. Also, it tends to lead to smaller prefixes being used, thus reducing the number of stages in the RPM trie tree search in many cases and thereby reducing the data plane workload. External route summarization and the "Always Route" philosophy allow router 100 to save forwarding table space and conserve control plane bandwidth. In addition, these techniques reduce the depth of the trie tree search, thus reducing the data plane workload. In addition, the "Always Route" philosophy allows packets to be routed based on a portion of their prefix, instead of being dropped or sent to the default route as in traditional routers. This improves the number of packets successfully routed through the network.

According to the principles of the present invention, router 100 advertises routing information to external routers similar to router 100 and to the various routing nodes within router 100. The term "route redistribution" refers to the use of a particular Internet routing protocol to advertise routes that are learned by some other means, such as by a different Internet routing protocol, by static route information, or by directly connected routes. Differences in routing protocol characteristics, such as metrics, administrative distance, and "classfull" versus "classless" capabilities may effect redistribution. Multi-protocol routing is fundamentally a formalized mechanism for comparing disparate routing information.

According to an advantageous embodiment, router 100 supports most standard routing protocols, such as RIP, OSPF, BGP, and IS-IS, as well as provisioned static routes. The routing nodes of router 100 learn routes from these routing sources, as well as from internally distributed route information. As described above, the internally distributed route information is summarized to reduce control plane bandwidth and to reduce the control plane workload on the individual internal routing nodes. Routes learned by each routing node must be distributed to the other routing nodes in a summarized form. Internally, router 100 distributes link state information and summarized routes.

Each routing node must select the best route from routes learned through these various sources. The present invention provides a technique for selecting the best route among routes learned from different routing protocols communicating with external routers, from provisioned static routes, and from summarized routing information provided by other internal routing nodes. The present invention also redistributes the routes to routing nodes of router 100 and to external routers.

According to the principles of the present invention, multi-protocol route redistribution in router 100 uses an arbitrary metric to compare routes learned through routing protocols with different metrics. For convenience, this arbitrary metric is called the "redistribution metric" herein. Different weights are assigned to routes learned from different sources, such as provisioning, standard routing protocols, and internally distributed routes that take the form of a default value of the redistribution metric.

Routes learned through techniques that provide more information about a route are considered better than routes learned through techniques that provide less information about the route and are given a better default redistribution metric. The values of actual metrics provided by each routing protocol are then used to refine the redistribution metric. Thus, the present invention provides a spread of redistribution metrics for routes within a particular routing protocol and enables a route to be selected based on both the routing protocol type through which the route was learned and the actual metrics provided by that routing protocol. The route with the best refined redistribution metric is selected as the best route.

Route redistribution according to the principles of the present invention also involves departure from guaranteed selection of optimal route. Since optimal routes are selected in an IP environment based on arbitrary metrics that vary from one routing protocol to another, the meaning of optimal route is uncertain. Thus, departure from this restriction has low impact and has the advantage of allowing more aggressive route summarization. The control plane processors in the switch modules and routing nodes of router 100 assume that all routes known by router 100 may be summarized and that the longest prefix match used to select the route provides the means for aggressive summarization.

Since router 100 does not guarantee optimal routes, the control plane processors make assumptions about the metrics provided by the routing protocols. These assumptions include: 1) adjacent OSPF domains do not have peer metrics information; 2) RIP may use an arbitrary hop count; 3) BGP does not exchange route metrics; and 4) IS-IS domains only use a hop count. Thus, the control plane processors of router 100 only need to distribute prefixes; routing node identification, and the refined redistribution metric internally. Router 100 uses the refined redistribution metric to select routes and to determine the metrics to use on the externally advertised routes.

The main considerations in constructing the routing table are: 1) default redistribution metric; 2) routing protocol metrics; and 3) prefix length. The default redistribution metric is the measure of trustworthiness of the source of the route. The control plane processors use the default redistribution metric to give preference to routes learned by more trusted routing protocols (i.e., by routing protocols that provide more information about the route). Stated differently, the default redistribution metric indicates the confidence level in the source of the route.

If a routing protocol learns multiple paths to the same destination, the routing protocol uses its own routing protocol metrics to calculate the best path to the given destination. These routing protocol metrics vary from routing protocol to routing protocol. The routing protocol metrics are used to refine the initial redistribution metric to allow selection based on both the trustworthiness of the routing protocol and the merit of the route within the routing protocol. The refined metric is called the "refined redistribution metric."

As a routing process receives updates and other information, the routing process chooses the best path to any given destination and attempts to install this path into the routing table. Router 100 allows the use of aggregated prefixes for similar prefixes that follow the same route within router 100 and for prefixes that are output by router 100 to the same port. The control plane processors (e.g., CPP 310, CPP 320) decide whether to install the routes presented by the routing processes into the forwarding tables in memory 350 based on the refined redistribution metric of the route in question.

If a path has the lowest refined redistribution metric to a particular destination compared to other routes with the same prefix in the table, the path having the lowest refined redistribution metric is installed in the forwarding table. If a route does not have the best refined redistribution metric, then the route is rejected.

TABLE 1 below illustrates exemplary default redistribution metric (DFM) values that vary according to how the route information was learned.

TABLE 1

| Source | DFM Value |
| --- | --- |
| Connected | 0 |
| Static | 1 |
| Internal routes | 5 |
| IPv4, IPv6 eBGP | 20 |
| IPv4, IPv6 OSPF | 110 |
| IPv4, IPv6 IS-IS | 115 |
| RIP, RIP, ng | 120 |
| iBGP | 200 |

The reasons for selection of the metrics above are as follows. Connected routes get preference since the port is directly connected to the end point of the route. Static routes have precedence over learned routes, since it is assumed that static routes have been manually provisioned for a good purpose. Internal routes within router 100 must be used to get the packet to the correct destination routing node. Exterior gateway protocols, such as eBGP, are given precedence over all interior gateway protocols. The eBGP protocol only exchanges neighbor information and does not involve topology. Finally, interior gateway protocols are given precedence based on the degree of characterization of the route, where the most characterized routes are given precedence. The equivalent IPv4 and IPv6 routing protocols are assigned the same default redistribution metrics.

As described above, each routing protocol has a set of metrics that differ from the metrics of other protocols. The default metric (defined above) of each protocol is used to give a preference to routes learned through trusted routing protocols. However, each routing protocol also provides its own set of actual metrics. To allow selection of routes from among routes learned by a single routing protocol, router 100 refines the default redistribution metric with the particular metrics obtained through the routing protocol, thereby generating a refined redistribution metric. In addition to allowing selection among routes within the same routing protocol, the refined distribution metric may result in a route with good metrics from a poorer routing protocol being selected over a route with poor metrics from a better routing protocol.

The refined redistribution metric (RRM) is determined by the following:

$$RRM = DRM + RPM \quad [\text{EQN. 1}]$$

where RRM is the refined redistribution metric, DRM is the default redistribution metric, and RPM is the routing protocol metric. The routing protocol metric is the metric obtained from the routing protocol through which the route was learned.

The routing protocol with the lowest refined redistribution metric (RRM) is the one that is used for the prefix in the forwarding tables and is the one that is distributed to other routing nodes, both internally to router 100 and externally to other routers coupled to router 100.

Routes are advertised to external routers using the routing protocols supported on each port. Thus, there must be a technique to convert the refined redistribution metric (RRM) back into a meaningful advertised route metric (ARM) for the routing protocol that advertises the route. This is done as follows:

$$\begin{aligned}
ARM = {} & \text{Min}(\text{Maximum Metric for Advertising} \\
& \text{Routing Protocol, Routing Protocol Metric of} \\
& \text{Selected Route} + \text{Max}(0, \text{Default Metric of} \\
& \text{Learning Routing Protocol} - \text{Default Metric} \\
& \text{of Advertising Routing Protocol})) \\
= {} & \text{Min}(\text{Maximum Metric for Advertising} \\
& \text{Routing Protocol, Max}(\text{Routing Protocol Metric of} \\
& \text{Selected Route, Refined Redistribution Metric} - \\
& \text{Default Metric of Advertising Routing Protocol}))
\end{aligned} \quad [\text{EQN. 2}]$$

where the Advertising Routing Protocol is the routing protocol through which the route is being advertised and the Learning Routing Protocol is the routing protocol through which the route was learned.

Figure 6:
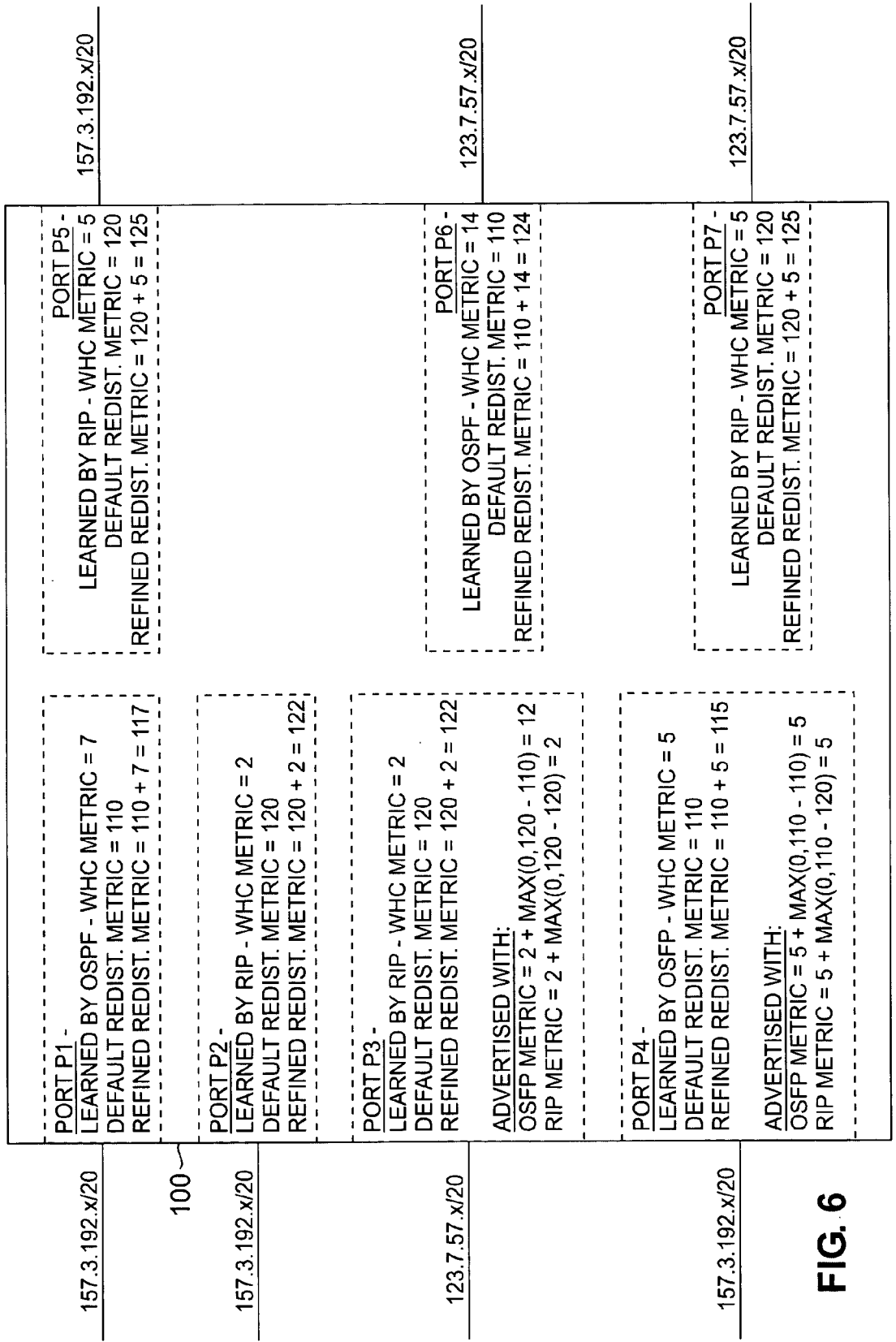
FIG. 6 illustrates the use of redistribution metrics in performing route selection and external advertisement.

FIG. 6 illustrates the use of redistribution metrics in performing route selection and external advertisement. Two examples are illustrated in FIG. 6, one for routes with a 20-bit prefix of 157.3.192.x/20 and one for routes with a 20-bit prefix of 123.7.57.x/20. Both examples have routes learned through RIP and OSPF protocols.

In the first example, routes for the prefix 157.3.192.x/20 are learned through four ports, namely P1, P2, P4 and P5. Ports P1 and P4 learn the routes through OSPF and Ports P2 and P5 learn the routes through RIP. On RIP ports P2 and P5, the refined redistribution metric is obtained using Equation 1 by adding the RIP default redistribution metric (=120) to the weighted hop count (WHC) received by RIP, giving refined redistribution metrics of 122 and 125, respectively. Similarly, on the OSPF ports P1 and P4, the refined redistribution metric is obtained using Equation 1 by adding the OSPF default redistribution metric (=110) to the metrics received by OSPF, giving refined redistribution metrics of 117 and 115, respectively. The route with the lowest refined redistribution metric is selected for use in building the forwarding tables and for route advertisement. This is the OSPF route learned through port P4 (refined redistribution metric =115).

To determine the metrics to accompany the route advertised through each routing protocol, Equation 2 is used. Thus, the advertised route metrics (ARMs) used to advertise routes in each routing protocol type are given by:

$$RIP\ ARM = \text{Min}(15, 5 + \text{Max}(0, 110 - 120)) = 5 \text{ and} \quad [\text{EQN. 3}]$$

$$OSPF\ ARM = \text{Min}(65535, 5 + \text{Max}(0, 110 - 110)) = 5. \quad [\text{EQN. 4}]$$

In the second example, routes for the 20-bit prefix 123.7.57.x/20 are learned through three ports, namely ports P3, P6 and P7. The route for port P6 is learned through OSPF and the routes for ports P3 and P7 are learned through RIP. On the RIP ports P3 and P7, the refined redistribution metric is obtained using Equation 1 by adding the RIP default redistribution metric (=120) to the hop count received by RIP, giving refined redistribution metrics of 122 and 125, respectively. Similarly, on OSPF port P6, the refined redistribution metric is obtained using Equation 1 by adding the OSPF default redistribution metric (=110) to the metrics received by OSPF, giving a refined redistribution metric of 124. The route with the lowest refined redistribution metric (RRM) is selected for use in building the forwarding tables and for route advertisement. This is the RIP route (RRM=122) learned through port P3.

To determine the metrics to accompany the route advertised through each routing protocol, Equation 2 is used. Thus, the advertised route metric (ARMs) used to advertise routes in each routing protocol type are given by $$RIP\ ARM = \text{Min}(15, 2 + \text{Max}(0, 120 - 120)) = 2 \quad [\text{EQN. 5}]$$

and $$OSPF\ ARM = \text{Min}(65535, 2 + \text{Max}(0, 120 - 110)) = 12. \quad [\text{EQN. 6}]$$

Thus, it can be seen that routes learned through a poorer routing protocol may be selected if the metrics are bad enough from routes learned with better routing protocols. The default redistribution metrics given in TABLE 1 and the routing protocol metrics given in these two examples are exemplary values only.

Router 100 distributes the refined redistribution metric along with the route prefix internally. Thus, the routing protocol can compute the advertised routing metric (ARM) associated with the advertised route for external nodes using the following equation:

$$ARM = \text{Min}(\text{Maximum Metric for Advertising Routing Protocol}, \text{Max}(0, \text{Refined Redistribution Metric} - \text{Default Metric of Advertising Routing Protocol})) \quad [\text{EQN. 7}]$$

which is a variation of Equation 2 where the value "Routing Protocol Metric of Selected Route" is replaced with zero, since the learned routing protocol metric for the selected route is not distributed.

For selection of the route to place into the forwarding table, the default redistribution metric (DRM) must be used for routes received through internal distribution. It is used directly, so Equation 7 does not apply to the internally distributed routes for purposes of selecting routes to place into the forwarding table. Since the "Internal Routes" entry in TABLE 1 has a very low value for default redistribution metric (i.e., DRM=5), router 100 internal routes are chosen in preference over all routes except connected and static routes. Router 100 internal routes are preferred above other learned routes because router 100 selects the best route among those learned through all routing nodes and because it is necessary to route the packets to the routing node handling the selected path. The use of the internal route default redistribution metric in selecting the route but using the refined redistribution metric when determining the advertised route metric assures that preference is given to getting packets to the selected internal routing node, while at the same time advertising the route with a metric based on an evaluation of the merits of the route relative to the routing protocol used to learn the route and the metrics received with it.

Figure 7:
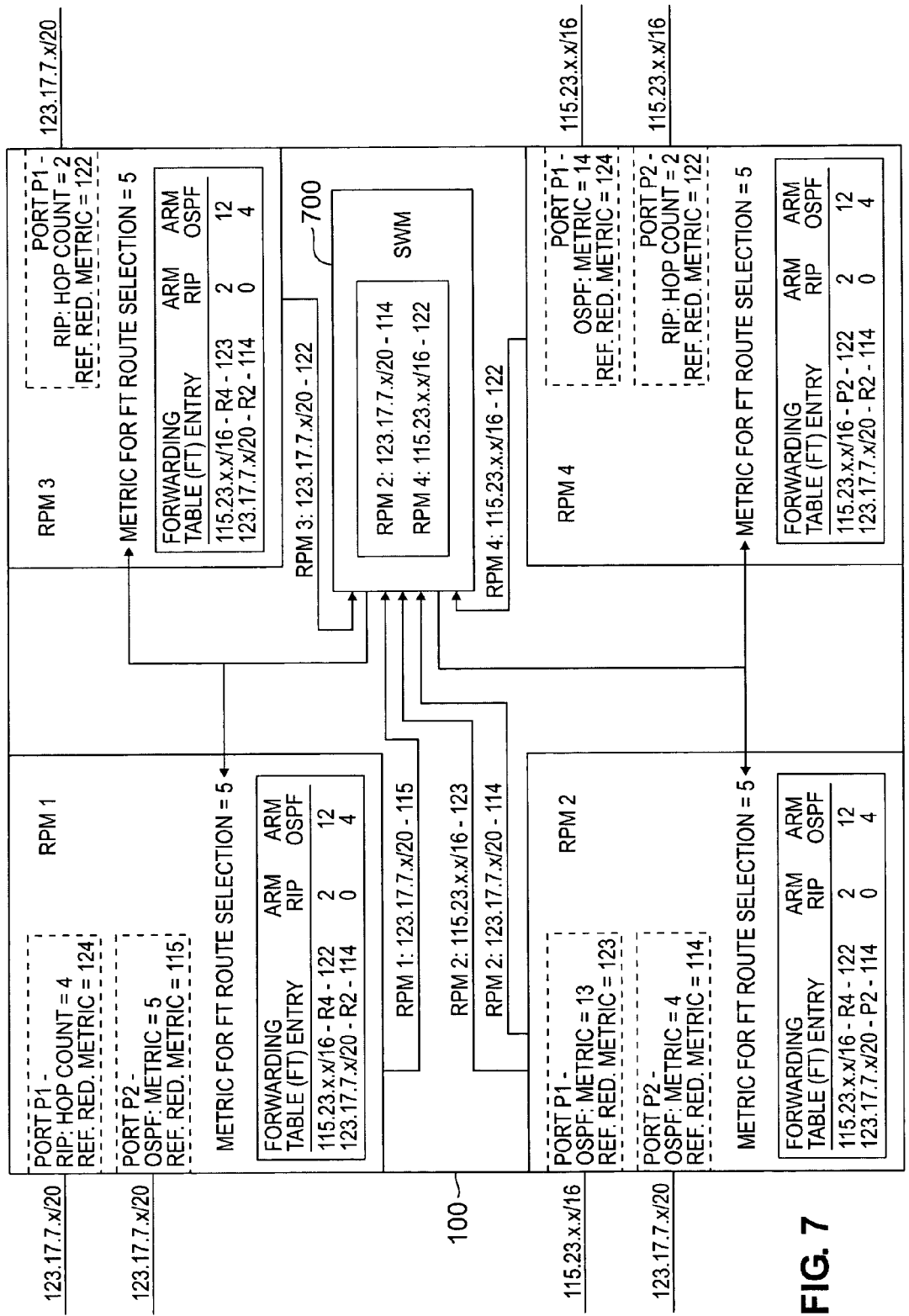
FIG. 7 illustrates the use of redistribution metrics in performing internal route selection, internal route redistribution, and external route redistribution.

FIG. 7 illustrates the use of redistribution metrics in performing internal route selection, internal route redistribution, and external route redistribution. Two routes are learned in this example: subnet 123.17.7.x/20 and subnet 115.23.x.x/16. RPM 1 learns the first route prefix, 123.17.7.x/20, through two sources: RIP on Port P1 and OSPF on Port P2. Since OSPF has the best metrics, RPM 1 sends the Port 2 route to switch module (SWM) 700. RPM 2 and RPM 3 learn the same route (123.17.7.x/20) through OSPF and RIP, respectively, and send the corresponding learned route information to SWM 700. The control plane processor in SWM 700 selects the route with the lowest refined redistribution metric (i.e., the route from RPM 2) and redistributes that route information back to all of the RPMs.

Each RPM builds its forwarding table based on the RPM 2 route, so the forwarding tables in RPM 1, RPM 3, and RPM 4 contain the route prefix 123.17.7.x/20 and the identifier "R2", which identifies RPM 2 for routes having that prefix. The forwarding table in RPM 2 contains the prefix 123.17.7.x/20 and the identifier "P2", which identifies port P2 of RPM 2 for that route. The metrics distributed through RIP and OSPF are given by Equation 7 (i.e., 0 and 4, respectively).

RPM 4 learns the second route prefix, 115.23.x.x/16, through two sources: OSPF on Port P1 and RIP on Port P2. Since RIP has the best metrics, RPM 1 sends the Port 2 route to SWM 700. RPM 2 also learns this route prefix through OSPF and sends the route to SWM 700. The control plane processor in SWM 700 selects the route with the lowest refined redistribution metric (i.e., the route from RPM 4) and redistributes it to all of the RPMs.

Each RPM builds its forwarding table based on the RPM 4 route, so the forwarding tables in RPM 1, RPM 2, and RPM 3 contain the route prefix 115.23.x.x/16 and the identifier "R4", which identifies RPM 4 for routes having that prefix. The forwarding table in RPM 4 contains the route prefix 115.23.x.x/16 and the identifier "P2", which identifies port P2 of RPM 4 for routes having that prefix. The metrics distributed through RIP and OSPF are given by Equation 7 (i.e., 2 and 12, respectively).

It is noted that in this second case (prefix 115.23.x.x/16), the metric distributed by OSPF is smaller than any of the metrics associated with the routes learned through OSPF. This is because the RIP route is considered to be better and the refined redistribution metric reflects this.

Although the present invention has been described with an exemplary embodiment, various changes and modifications may be suggested to one skilled in the art. It is intended that the present invention encompass such changes and modifications as fall within the scope of the appended claims.

What is claimed is:

1. A router for interconnecting external devices coupled to said router, said router comprising:
   a switch fabric;
   a plurality of routing nodes coupled to said switch fabric, wherein each of said plurality of routing nodes is capable of exchanging data packets with said external devices and with other ones of said plurality of routing nodes via said switch fabric; and
   a first control processor associated with a first one of said plurality of routing nodes capable of generating a first refined redistribution metric associated with a first route in a routing table of said first routing node, wherein said first control processor generates said first refined redistribution metric based on a first default redistribution metric associated with a first routing protocol associated with said first route, wherein said first default redistribution metric is selected from a plurality of default redistribution metrics, each default redistribution metric having a value based upon a relative confidence level in an associated routing protocol, wherein said first control processor generates a second refined redistribution metric associated with a second route in said routing table of said first routing node, generates said second refined redistribution metric based on a second default redistribution metric associated with a second routing protocol associated with said second route, and distributes an advertised route metric derived from said selected one of said first and second refined redistribution metrics to said external devices.

2. The router as set forth in claim 1, wherein said first control processor generates said first refined redistribution metric based on a first routing protocol metric received from said first routing protocol associated with said first route.

3. The router as set forth in claim 2, wherein said first control processor generates said second refined redistribution metric based on a second routing protocol metric received from said second routing protocol associated with said second route.

4. The router as set forth in claim 3, wherein said first and second routes are associated with the same destination address.

5. The router as set forth in claim 4, wherein said first control processor compares said first refined redistribution metric and said second refined redistribution metric and, based on said comparison, selects one of said first and second refined redistribution metrics to be stored in an entry in said routing table associated with said first route.

6. The router as set forth in claim 5, wherein said first control processor distributes said selected one of said first and second refined redistribution metrics to said other ones of said plurality of routing nodes.

7. The router as set forth in claim 6, further comprising a second control processor associated with said switching fabric capable of comparing said selected refined redistribution metric received from said first routing node with a second selected refined redistribution metric received from a second routing node.

8. The router as set forth in claim 7, wherein said second control processor, based on said comparison, selects one of said selected refined redistribution metric received from said first routing node and said second selected refined redistribution metric received from said second routing node to be distributed to said other ones of said plurality of said routing nodes.

9. A communication network comprising a plurality of routers that communicate data packets to one another and to interfacing external devices, each of said plurality of routers comprising:
   a switch fabric;
   a plurality of routing nodes coupled to said switch fabric, wherein each of said plurality of routing nodes is capable of exchanging data packets with said external devices and with other ones of said plurality of routing nodes via said switch fabric; and
   a first control processor associated with a first one of said plurality of routing nodes capable of generating a first refined redistribution metric associated with a first route in a routing table of said first routing node, wherein said first control processor generates said first refined redistribution metric based on a first default redistribution metric associated with a first routing protocol associated with said first route, and wherein said first default redistribution metric is selected from a plurality of default redistribution metrics, each default redistribution metric having a value based upon a relative confidence level in an associated routing protocol, wherein said first control processor further generates a second refined redistribution metric associated with a second route in said routing table of said first routing node based on a second default redistribution metric associated with a second routing protocol associated with said second route, distributes one of said first and second refined redistribution metrics to said other ones of said plurality of routing nodes, compares said first refined redistribution metric and said second refined redistribution metric and, based on said comparison, selects one of said first and second refined redistribution metrics to be stored in an entry in said routing table associated with said first route, and distributes an advertised route metric derived from said selected one of said first and second refined redistribution metrics to said external devices.

10. The communication network as set forth in claim 9, wherein said first control processor generates said first refined redistribution metric based on a first routing protocol metric received from said first routing protocol associated with said first route.

11. The communication network as set forth in claim 10, wherein said first control processor generates said second refined redistribution metric based on a second routing protocol metric received from said second routing protocol associated with said second route.

12. The communication network as set forth in claim 11, wherein said first and second routes are associated with the same destination address.

13. The communication network as set forth in claim 12, wherein said first control processor distributes said selected one of said first and second refined redistribution metrics to said other ones of said plurality of routing nodes.

14. The communication network as set forth in claim 13, further comprising a second control processor associated with said switching fabric capable of comparing said selected refined redistribution metric received from said first routing node with a second selected refined redistribution metric received from a second routing node.

15. The communication network as set forth in claim 14, wherein said second control processor, based on said comparison, selects one of said selected refined redistribution metric received from said first routing node and said second selected refined redistribution metric received from said second routing node to be distributed to said other ones of said plurality of said routing nodes.

16. A method for distributing routing information for use in a router comprising a switch fabric and a plurality of routing nodes coupled to the switch fabric, wherein each of the plurality of routing nodes is capable of exchanging data packets with external devices and with other routing nodes via the switch fabric, the method comprising the steps of:
   receiving in a first of the plurality of routing nodes a first routing protocol metric from a first routing protocol associated with a first route in a routing table of the first routing node;
   determining a first default redistribution metric associated with the first routing protocol, wherein the first default redistribution metric is selected from a plurality of default redistribution metrics, each default redistribution metric having a value based upon a relative confidence level in an associated routing protocol;
   generating a first refined redistribution metric from the first routing protocol metric and the first default redistribution metric;
   receiving in the first routing node a second routing protocol metric from a second routing protocol associated with a second route in the routing table of the first routing node;
   determining a second default redistribution metric associated with the second routing protocol;
   generating a second refined redistribution metric from the second routing protocol metric and the second default redistribution metric;
   comparing the first refined redistribution metric and the second refined redistribution metric;
   selecting one of the first and second refined redistribution metrics based on the comparison to be stored in an entry in the routing table associated with the first route; and
   distributing an advertised route metric derived from the selected one of the first and second refined redistribution metrics to the external devices.

17. The method as set forth in claim 16, wherein the first and second routes are associated with the same destination address.

18. The method as set forth in claim 17, further comprising the step of distributing the selected one of the first and second refined redistribution metrics to the other ones of the plurality of routing nodes.

19. The method as set forth in claim 18, further comprising the step of comparing in a control processor associated with the switching fabric the selected refined redistribution metric received from the first routing node with a second selected refined redistribution metric received from a second routing node.

20. The method as set forth in claim 19, further comprising the step, based on the comparison, of selecting one of the selected refined redistribution metric received from the first routing node and the second selected refined redistribution metric received from the second routing node to be distributed to the other ones of the plurality of the routing nodes.

* * * * *